United States Patent
Jacimovic et al.

(10) Patent No.: US 12,496,782 B2
(45) Date of Patent: Dec. 16, 2025

(54) VISION SYSTEM FOR IDENTIFYING SUPPORT STRUCTURES OF 3D PRINTED COMPONENTS

(71) Applicants: Stefano Maranò, Zurich (CH); ABB Schweiz AG, Baden (CH)

(72) Inventors: Jacim Jacimovic, Wettingen (CH); Elisabet Capon, Zurich (CH); Ioannis Lymperopoulos, Dietikon (CH); Andrea Cortinovis, Wettingen (CH); Stefano Maranò, Zurich (CH)

( * ) Notice: Subject to any disclaimer, the term of this patent is extended or adjusted under 35 U.S.C. 154(b) by 434 days.

(21) Appl. No.: 18/003,755

(22) PCT Filed: Jul. 8, 2021

(86) PCT No.: PCT/IB2021/056151
§ 371 (c)(1),
(2) Date: Dec. 29, 2022

(87) PCT Pub. No.: WO2022/009149
PCT Pub. Date: Jan. 13, 2022

(65) Prior Publication Data
US 2023/0256683 A1   Aug. 17, 2023

(30) Foreign Application Priority Data
Jul. 9, 2020   (EP) .................................... 20184976

(51) Int. Cl.
*B29C 64/40* (2017.01)
*B22F 10/30* (2021.01)
(Continued)

(52) U.S. Cl.
CPC .............. *B29C 64/40* (2017.08); *B22F 10/30* (2021.01); *B22F 10/40* (2021.01); *B22F 10/60* (2021.01);
(Continued)

(58) Field of Classification Search
CPC .......... B22F 10/30; B22F 10/40; B22F 10/60; B29C 64/40; G06V 10/26; G06V 20/64;
(Continued)

(56) References Cited

U.S. PATENT DOCUMENTS

| | | |
|---|---|---|
| 2017/0239893 A1 | 8/2017 | Hoover et al. |
| 2019/0176403 A1 | 6/2019 | Hutchinson |

(Continued)

OTHER PUBLICATIONS

Alhwarin, Faraj, et al.; "Improving additive manufacturing by image processing and robotic milling"; 2015 IEEE International Conference on Automation Science and Engineering (CASE); IEEE; Gothenburg, Sweden; Aug. 24, 2015; 6 Pages.

Qi, Xinbo, et al.; "Applying Neural-Network-Based Machine Learning to Additive Manufacturing Current Applications, Challenges, and Future Perspectives"; Engineering, vol. 5, Issue 4; Science Direct; Jul. 3, 2019; 9 Pages.

(Continued)

Primary Examiner — Rami R Okasha
(74) Attorney, Agent, or Firm — Whitmyer IP Group LLC

(57) ABSTRACT

A system and method are described for post-processing a 3D printed component. For example, support structures for the 3D printed component may be removed during post-processing. In the system and method, a first image of a component is stored in memory. A second image of a 3D printed component corresponding to the component is also captured. One or more cutting paths between the 3D printed component and the support structures is then determined based on the first image and the second image. The 3D printed component may then be autonomously separated from the support structures by cutting through the cutting path.

18 Claims, 7 Drawing Sheets

(51) Int. Cl.
    *B22F 10/40*         (2021.01)
    *B22F 10/60*         (2021.01)
    *B33Y 40/20*         (2020.01)
    *G06V 10/24*         (2022.01)
    *G06V 10/26*         (2022.01)
    *G06V 20/64*         (2022.01)
    *B33Y 50/02*         (2015.01)

(52) U.S. Cl.
    CPC .............. *G06V 10/26* (2022.01); *G06V 20/64* (2022.01); *B33Y 40/20* (2020.01); *B33Y 50/02* (2014.12); *G06V 10/245* (2022.01)

(58) Field of Classification Search
    CPC .. G06V 10/245; G06V 2201/06; B33Y 40/20; B33Y 50/02; B33Y 40/00
    See application file for complete search history.

(56) References Cited

U.S. PATENT DOCUMENTS

| | | | |
|---|---|---|---|
| 2019/0204807 A1* | 7/2019 | Nelaturi | B29C 64/40 |
| 2020/0160497 A1* | 5/2020 | Shah | G06T 7/13 |
| 2020/0324486 A1* | 10/2020 | Mantell | B29C 64/112 |

OTHER PUBLICATIONS

International Search Report and Written Opinion of the International Searching Authority; Application No. PCT/IB2021/056151; Completed: Sep. 29, 2021; Mailing Date: Oct. 10, 2021; 12 Pages.
European Office Action; Application No. 20184976.7; Completed: Dec. 12, 2024; 7 Pages.

\* cited by examiner

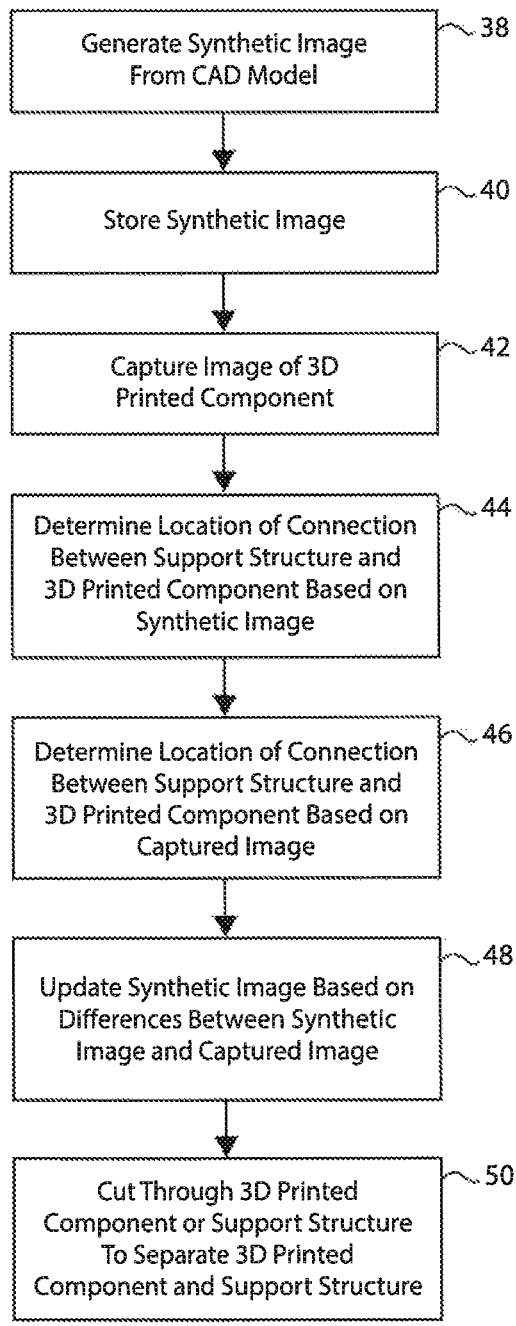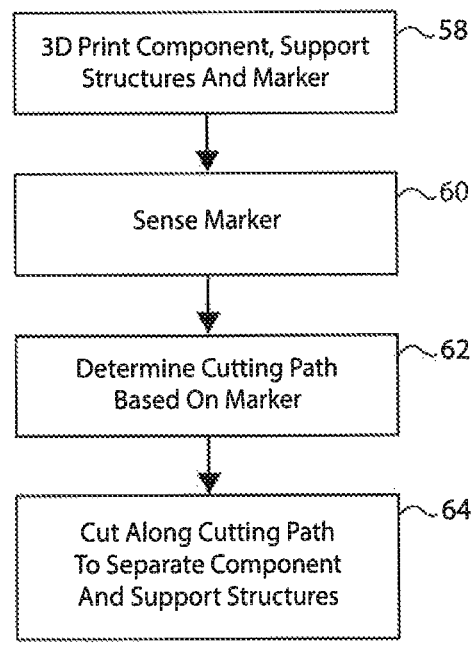
FIG. 6
FIG. 7

VISION SYSTEM FOR IDENTIFYING SUPPORT STRUCTURES OF 3D PRINTED COMPONENTS

TECHNICAL FIELD

The present inventions relate generally to a 3D printing of components, and more particularly, to identifying the support structures of a 3D printed component.

BACKGROUND

The technology of 3D printing has allowed a wide variety of components to be created which push the boundaries of conventional manufacturing and enable the manufacture of components that perfectly match application requirements. However, the level of automation in 3D printing technologies is still very limited, since many pre- and post-processing steps must be done manually. As a result, the production of customized parts in large volumes can entail large costs, which is mainly caused by rigid production systems and a significant number of manual steps required for the process design and the execution of processing steps. A key element to increase automation and autonomy in additive manufacturing is to enhance the flow of information between actual printing of 3D printed components and the manufacturing cell which performs further processing of the component.

3D printing technologies (both for metals and plastics) allow a large variety of components to be made with high flexibility. However, these technologies still include many manual pre- and post-processing steps. The three most important drawbacks of current processes include the long length of time of the process, quality inconsistencies and unreliability, and the high price of the produced components. Furthermore, the combination of different materials and parts with a 3D printed component in order to obtain a fully functional product still requires many design and organizationally intensive tasks which involve a significant amount of manual labor. For example, it is still difficult to use different materials during 3D printing processes for one specific part. Moreover, to assemble previously fabricated parts produced more competitively by other manufacturing methods, such as electronics, casting or milling, still requires many manual steps. As a result, it is common to move 3D printed parts to another processing line or even to another location to accomplish the assembly of various 3D printed components and machined components into a final product.

It is also understood that 3D printing of a component requires some type of support structure to retain the component in place as it is being formed by the 3D printing system. After the component has been formed by the 3D printing system, various post-processing steps are required to prepare the component. For example, the component must then be separated from the support structure before it can be further processed and/or used. Inspections may also be desirable. A variety of methods may be used to separate the component and the support structure. For example, fluids may be used to dissolve the support structures away from the component. Alternatively, where the support structures are made of materials that are not easily dissolvable, the support structures may be physically cut to separate the component from the support structures. In this case, automated removal of support structures for 3D printed components with a machine (e.g., CNC, robots, etc.) typically relies on pre-programed path trajectories that determine where a cutting tool will cut through the support structures or component. However, this method can result in the cuts being made at undesirable locations and inconsistent cuts from component to component due to physical deformations (bending, lifting, cracking, etc.) that occur unpredictably at various geometrical positions of components and support structures. Additional problems arise during automated removal of support structures due to the lack of quality checks of the support structure removal process. Because of these problems, post-processing of 3D printed components is currently a slow and costly process. Therefore, it would be desirable to remove support structures accurately and consistently from component to component.

SUMMARY

A system and method are provided for post-processing a 3D printed component, which may include removing a support structure from the 3D printed component. The system and method include storing a first image of a component in memory and capturing a second image of a 3D printed component corresponding to the component. A cutting path between the 3D printed component and the support structure is then determined based on the first and second images. The support structure and the 3D printed component may then be separated from each other autonomously by cutting through the cutting path. The invention may also include any other aspect described below in the written description or in the attached drawings and any combinations thereof.

BRIEF DESCRIPTION OF THE DRAWINGS

The invention may be more fully understood by reading the following description in conjunction with the drawings, in which:

FIG. 6 is a flow chart of one embodiment of a support structure removal system;

FIG. 7 is a flow chart of another embodiment of a support structure removal system;

DETAILED DESCRIPTION

One problem with 3D printing technologies is that the conformation of 3D printed components hardly ever matches accurately the specifications provided in the corresponding CAD drawings, due to undesired events that occur during the printing process, such as thermal stresses, impurities, and other disturbances. Therefore, CAD drawings alone may be insufficient to generate cutting paths for a machine used to remove the support structure from a component. Therefore, the described embodiments herein may be used in an autonomous vision system that records 3D printed components and generates cutting paths for separating the component and support structure. It may also be possible for the autonomous vision system to use a machine learning or artificial intelligence algorithm.

The described embodiments also include an information marker solution for autonomous identification and manufacturing of 3D printed components. Additive manufacturing technologies enable the production of widely different parts based on their CAD design. In addition, it is possible to print several components of different designs on the same base plate. Therefore, it would be desirable to be able to automatically identify 3D printed components in order to automate post-processing of components. Post-processing of the 3D printed components may require a significant amount of component related information, such as material, CAD model, support structure design, quality specifications, etc. Therefore, it would be desirable to incorporate markers on 3D printed components, support structures or the base plate during the 3D printing process in order to encode information within the markers about the component to support post-processing activities.

Figure 1:
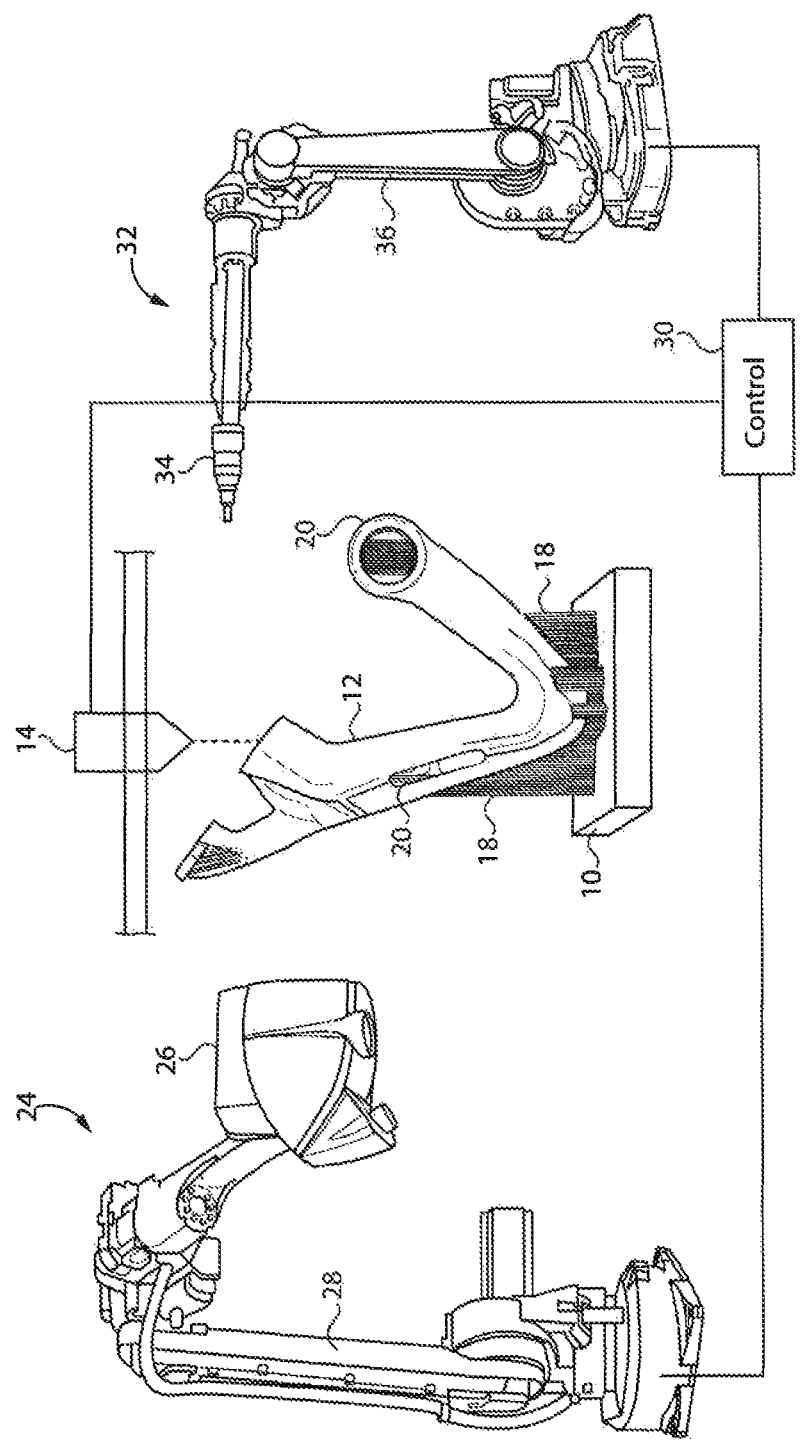
FIG. 1 is a schematic view of a 3D printing system.
Figure 2:
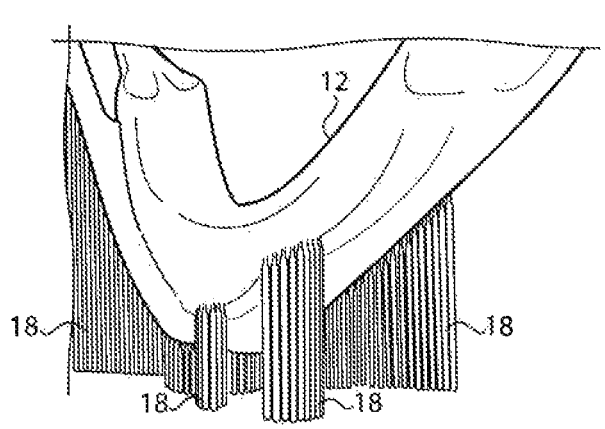
FIG. 2 is a close-up perspective view of a portion of a 3D printed component.
Figure 3:
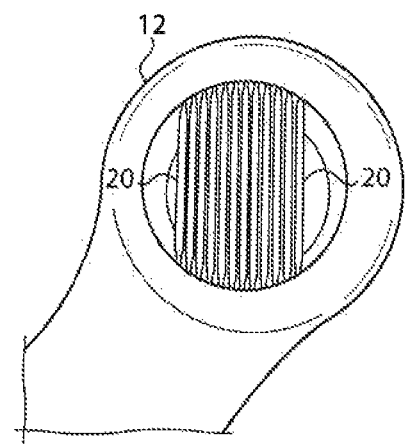
FIG. 3 is close-up perspective view of another portion of the 3D printed component.
Figure 4:
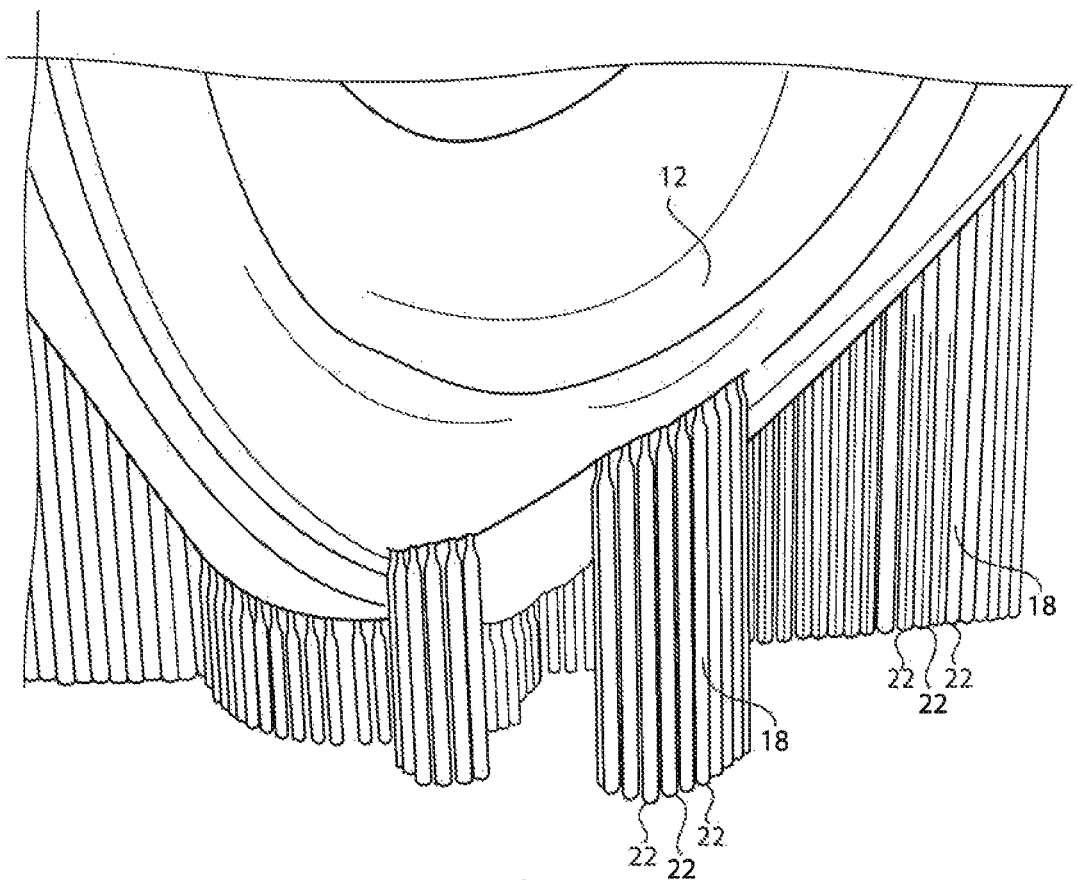
FIG. 4 is another enlarged perspective view of the portion of the 3D printed component of FIG. 2.

As shown in FIG. 1, the system may have a base 10 upon which a 3D printed component 12 is formed by a 3D printer 14. The 3D printed component is formed on the base 10 and is attached to the base 10 by one or more support structures 18, which are attached at opposite sides to the base 10 and the 3D printed component 12. Preferably, the support structures 18 are formed by the 3D printer 14 as it forms the 3D printed component 12. Thus, for example, where the 3D printed component 12 is formed of a metal by a 3D metal printer 14, the support structures are also metal. In any event, it is preferable for the 3D printed component 12 and the support structures 18 to be formed of the same material and having the same curing (e.g., plastic parts). Support structures 20 may also be printed to support internal structures of the 3D printed component 12. That is, holes or cavities 22 of the 3D printed component 12 may have support structures 20 attached at opposite sides to different portions to support the hole or cavity 22 during forming. The base support structures 18 are shown in more detail in FIG. 2, and the internal support structures 20 are shown in more detail in FIG. 3. As shown in FIG. 4, the support structures may be made up of a plurality of support members 22 that are spaced apart from each other and are parallel to each other. Preferably, at least five support members 20 are equally spaced from each other and parallel to each other, or even more preferably, at least ten support members 20 are equally spaced from each other and parallel to each other.

A vision system 24 with a camera 26 (e.g., 3D cameras, laser sensors, common RGB cameras) mounted on a robotic arm 28 may also be provided to capture images of the 3D printed component 12. It is also possible for the vision system 24 to be mounted elsewhere in a static location or on another moveable structure if desired. After the 3D printed component 12 has been formed by the 3D printer 14, the vision system captures 24 one or more images of the 3D printed component 12 and the support structures 18, 20. As described further below, a controller 30 then determines a cutting path 56 (FIG. 5) between the 3D printed component 12 and the support structures 18, 20. A cutting system 32 with a cutting head 34 and a robotic arm 36 is also provided for cutting through the 3D printed component 12 or the support structures 18, 20 along the cutting path 56 to separate the 3D printed component 12 from the support structures 18, 20. The cutting system 32 is considered to be a post-processing system 32, and it is understood that other post-processing systems 32 are also possible, such as inspection systems 32. Preferably, cutting of the 3D printed component 12 or support structures 18, 20 involves the use of a rotating mill, a laser, or a reciprocating saw on the cutting head 34. It is understood that the method and system herein could be used with other processing systems as well, such as inspection systems, where the system learns and tracks the quality of a plurality of 3D printed components 12.

In one embodiment, the determination of the cutting paths 56 may be done through two steps. In the first step, the system may utilize off-line learning from CAD models. In the second step, the system may utilize on-line learning from quality assessments ("continuing education"). It is understood that off-line learning refers to updates that occur before or apart from actual use with a 3D printed component 12, whereas on-line learning refers to updates that occur during or as a result of actual use with a 3D printed component 12.

Off-line learning may include generating a synthetic image from a CAD model (e.g., RGB or Cloud of Points) in order to build a representative dataset. It is understood that a synthetic image is a digital image defined by data that can be recognized by the controller 30 and is modifiable to update the synthetic image based on differences identified between the CAD model and a captured image of the 3D printed part 12 or differences identified between two or more 3D printed parts 12. It may be desirable to generate multiple images of the component 12 and support structures 18, 20 from different viewpoints. It may also be desirable to generate images of the component 12 with partially removed support structures 18, 20 from different viewpoints. It may also be desirable to generate images of the component 12 and/or support structures 18, 20 with deviations from the reference CAD model, such as partial detachment of the component 12 from the support structures 18, 20, deformation due to thermal stresses, undesired porosity that extends over both the component 12 and support structures 18, 20, or other defects that may be associated with 3D printing. The CAD model may also be used to generate cutting paths 56 which may be visible on the synthetic image and/or regions may be generated to define the component 12 and the support structures 18, 20 which may then be used to generate the cutting paths 56. The system is preferably trained using machine learning or artificial intelligence techniques to generate the cutting paths 56 from the synthetic image. As the system is used on-line to separate support structures 18, 20 from multiple 3D printed components 12, the synthetic model may be updated continuously (i.e., based on each 3D printed component 12 and the images captured thereof) or periodically (i.e., based on images captured from multiple 3D printed components 12). Thus, the cutting paths 56 that are determined by the system adjust over time as the system updates the synthetic image based on learning that occurs during on-line use.

Off-line generation of the synthetic image will likely provide reliable results in many cases but may face challenges with unexpected deformations in some 3D printed components 12. For this reason, a system that learns from existing experience is preferred. On-line learning may begin with the use of the off-line generated synthetic image on a new 3D printed component 12. Real captured images of the 3D printed component acquired during the cutting process (after removing each supporting structure 18, 20) may then be stored. The most recent images may then be compared with the original CAD model (i.e., initial synthetic image) as a quality control action. If differences from the reference CAD model are detected beyond a threshold, the synthetic image may be updated to adjust the image and the correct cutting paths 56. The quality control action may also be used to confirm that the support structures 18, 20 are completely and adequately removed or to analyze if cracks appear on the 3D printed component 12 during the support structure 18, 20 removal. Retraining of the system and updates of the synthetic image may be done continuously or periodically. After enough updates, the system can be expected to become more and more reliable and may eventually be used based on the vision inputs from the 3D printed components 12 alone (i.e., without reference to the CAD models).

Figure 5:
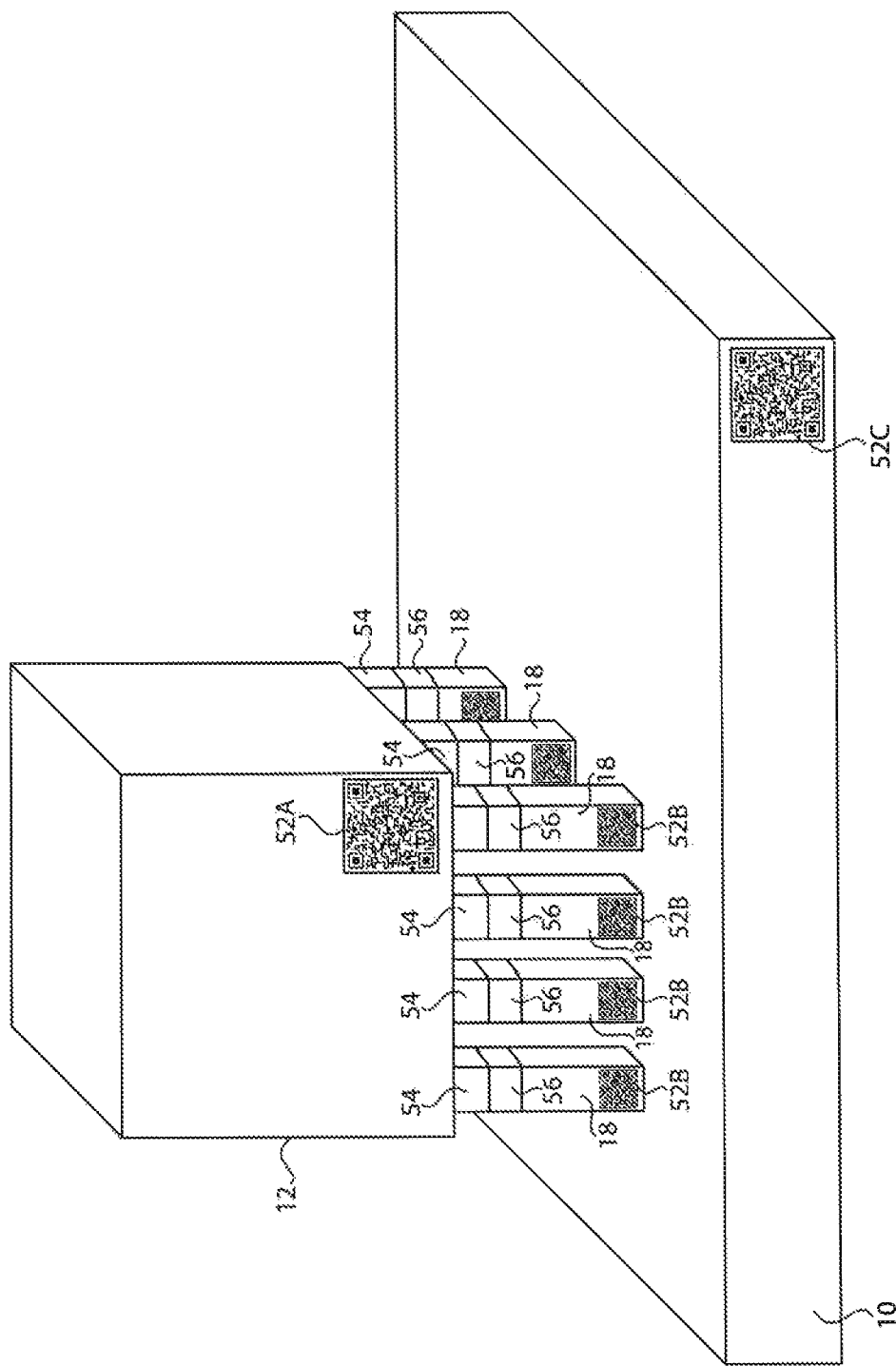
FIG. 5 is a schematic view of another 3D printed component with identification markers.

The system acquires inputs from the camera sensors 26 and stores captured images in computer memory. Using the autonomous computer vision algorithm, a first determination of cutting paths 56 between the 3D printed component 12 and the support structures 18, 20 may be performed. In a second step, the algorithm may group different regions of the support structures 18, 20 in independent regions. For example, it may be desirable to group the base support structures 18 separate from the internal support structures 20 since cutting of the different support structures 18, 20 may affect the 3D printed component 12 differently. Thus, it is desired that each region consists of closely located support structures 18, 20 that will be affected by the cutting operation in that area. In each region, the algorithm detects the cutting paths 56 between the support structures 18, 20 and 3D printed component 12 separate from the other regions. Optionally, the autonomous computer vision algorithm may compare the determined cutting paths 56 in each region with the original CAD model. Thus, when capturing images of a 3D printed component 12, it may be desirable to capture at least two different images of the 3D printed component 12 of at least two different regions of the 3D printed component 12 where each image is of a different region. The two different regions in the synthetic image corresponding to the two different regions of the 3D printed component 12 may then be updated based on the two different captured images. The system may also identify and quantify deviations (differences) between the captured images and the CAD model or between the captured images of different 3D printed components 12. Preferably, as shown in FIG. 5, the autonomously generated cutting paths 56 are positioned through the support structures 18, 20 slightly spaced away from the connection point 54 with the 3D printed component 12 to provide a safety margin from the 3D printed component 12. Finally, the set of cutting paths 56 are sent to the cutting system 34 for actual cutting and separating of the support structures 18, 20 from the 3D printed component 12.

One set of steps of the system include capturing images of the CAD model and/or actual 3D printed components 12. The connection points 54 between the support structures 18, 20 and the 3D printed component 12 may then be autonomously determined using the algorithm. The calculated connection points 54 and the connection points in the original CAD model may then be compared. Deviations in the captured images may then be identified and quantified. Cutting paths 56 through the support structures 18, 20 slightly away from the connection points 54 to provide a safety margin may then be autonomously generated to provide the actual paths 56 used for cutting. The cutting paths 56 may then be communicated to the cutting system 32 which performs the actual cutting. It may also be desirable for the vision system to capture additional images in the regions by zooming (e.g., optical or digital zoom) inside a region of interest where the support structures 18, 20 are attached to the 3D printed component 12. These images may then be used in the learning algorithm to refine and improve the accuracy of the produced cutting paths 56.

An exemplary flow chart of a system and method as described herein is shown in FIG. 6. As shown, a synthetic image is initially generated from a CAD model of a component (38). It is also understood that the initial image may be captured from an actual 3D printed component 12 instead. The initial image of the component is then stored in memory (40). It is also possible for a plurality of images to be used for the initial image. Machine learning or artificial intelligence may also be used with the plurality of initial images to learn the location of the connection points 54 between the 3D printed component 12 and the support structures 18, 20. In such a case, at least some of the plurality of initial images would include both the 3D printed component 12 and the support structures 18, 20 attached thereto. A synthetic image could also be formed from the plurality of initial images and learning. An image of an actual 3D printed component 12 is then captured, where the 3D printed component 12 corresponds to the component of the initial image (42). Preferably, the captured image is an RGB image, depth image, cloud of points or line scan. The initial image may also be an RGB image, depth image, cloud of points or line scan if desired. It is also possible for a plurality of images to be captured of different actual 3D printed components 12. Machine learning or artificial intelligence may also be used with the plurality of captured images of actual components 12 to learn the location of the connection points 54 between the 3D printed component 12 and the support structures 18, 20. In such a case, each of the plurality of captured images would include both the 3D printed component 12 and the support structures 18, 20 attached thereto. A synthetic image could also be formed from the plurality of captured images and learning. Based on the initial image (44) and the captured image of the 3D printed component 12, one or more cutting paths 56 is then determined between the 3D printed component 12 and one or more support structures 18, 20 attached to the 3D printed component 12 (46). The cutting paths 56 may be determined using a database of a plurality of the initial image and a plurality of the captured image and machine learning or artificial intelligence of the database. The synthetic image (initial image) may then be updated based on differences between the synthetic image and the captured image (48). The cutting system 32 may then use the generated cutting path 56 to cut through the 3D printed component 12 or the support structure 18, 20 along the cutting path 56 to separate the 3D printed component 12 from the support structure 18, 20 (50). It is understood that the described system and methods may be implemented in the controller 30 in the form of a non-transitory computer readable medium including program code that controls the 3D printer 14, vision system 24 and/or cutting system 32 to autonomously perform the described methods.

As illustrated in FIG. 5, it is also possible to use one or more markers 52A-C to determine a cutting path 56 between the 3D printed component 12 and the support structures 18, 20 attached to the 3D printed component 12. As shown, a marker 52A may be embedded in the 3D printed component 12 which encodes information about the component 12, the base plate 10, the support structures 18, 20 and/or the required post-processing steps and tools. Markers 52B that encode such information may also be embedded in one or more of the support structures 18, 20. A marker 52C with such information may also be embedded in the base plate 10. Preferably, in the case of the markers 52A, 52B embedded in the 3D printed component 12 and/or the support structures 18, 20, it is preferable for the markers 52A, 52B to be printed on the 3D printed component 12 and/or the support structures 18, 20 with the 3D printer 14 at the time that the 3D printed component 12 and support structures 18, 20 are being printed by the 3D printer 14. Although the marker 52C on the baseplate 10 may be embedded or placed on the base plate 10 separately from the 3D printing, it is also possible that the marker 52C may be 3D printed on the base plate 10 by the 3D printer 14 at the time of printing or that the base plate 10 and marker 52C could be 3D printed together by the 3D printer 14 at the time of printing. It is also possible for the markers 52A-C to be engraved with a laser. The markers 52A-C may enable a flexible, reliable and self-contained means to automatically identify 3D printed components 12 to adequately formulate the full cascade of post-processing activities, thus leading to cost competitive production of customized 3D printed components 12.

By embedding a marker 52A-C on the 3D printed component 12, support structures 18, 20 or the base plate 10 of a 3D printed component 12, information related to the 3D printed component 12 and the required post-processing steps may be made available together with the component 12. Thus, the machines and devices used for post-processing may read reliable information about the actual components 12 to be processed from the markers 52A-C to enable autonomous post-processing activities. Additionally, the required equipment, tools and machines needed for a given component 12 to be post-processed might be component-dependent. Therefore, it is possible with the use of the markers 52A-C for 3D printed components 12 to contain all the information needed to enable cell autonomy.

A wide range of relevant information may be needed about a 3D printed component 12, such as material, mechanical and electrical properties, quality specifications, support structures 18, 20 and CAD design, in order to complete one or more post-processing steps, such as powder removal, support structure 18, 20 removal, quality inspection or thermal treatment for stress releasing, etc. The use of markers 52A-C to encode such information relevant to each 3D printed component 12 may enable the flow of information from an actual 3D printed component 12 to other machines which perform the post processing operations.

The type of information that may be provided by the markers 52A-C includes (but is not limited to): the number and position of components 12 printed on the base plate 10; the specifications of the 3D printed component 12, such as material, mechanical and electrical properties and quality constraints; required cutting tools and their parameterization (e.g., cutting speed, etc.) for cutting through the support structures 18, 20; the dimensions and location of the support structures 18, 20; constraints on post-processing steps, such as mechanical limitations of the 3D printed component 12; information on how to remove the powder left from the 3D printing and the support structures 18, 20; information on heat treatment parameters for a furnace to use; and information on how to assemble 3D printed components 12 into an end-product (e.g., assembly steps). Where markers 52B are provided on the support structures 18, 20 for removal of the support structures 18, 20, it may be desirable to provide separate markers 52B on separate support structures 18, 20 to provide independent location information of the support structures 18, 20 to improve accuracy when removing multiple support structures 18, 20.

The markers 52A-C may be sensed by the vision system 24, and the controller 30 may determine the location of the cutting path 56 based on the sensed marker 52A-C. The cutting system 32 may then cut through the 3D printed component 12 or the support structure 18, 20 along the cutting path 56 to separate the 3D printed component 12 from the support structure 18, 20. The markers 52A-C may also encode information associated with a particular 3D printed component 12, the support structures 18, 20 and the post-processing steps. The marker 52A-C is preferably created during the 3D printing process using the same printer 14 used to print the 3D printed component 12 and the support structures 18, 20. The markers 52A-C may include various features. For example, a marker 52A-C may be printed either on the 3D printed component 12, on the support structures 18, 20, or on the base plate 10 containing multiple, and optionally different, 3D printed components 12. A marker 52A-C may encode information in a machine-readable format such as a QR code, a barcode, a notch, a series of notches, engravings, or reliefs. A marker 52A-C may encode information about other markers 52A-C or the 3D printed component 12, such as relative distance to other markers 52A-C, to the 3D printed component 12, to the support structures 18, 20, to the connection points 54 between the 3D printed component 12 and the support structures 18, 20, to the cutting path 56 between the 3D printed component 12 and the support structures 18, 20, or may include the connection head type between the 3D printed component 12 and the support structures 18, 20, in order to support post-processing of the part. Information about the dimensions of the connection points 54 between the support structures 18, 20 and the 3D printed component 12 may also be used to calculate the force required for cutting. The markers 52A-C may be used to indicate critical points on the support structures 18, 20. The markers 52A-C may indicate geometrical points where quality inspection needs to be applied and how to perform such inspection. The markers 52A-C may encode the relative location of the marker 52A-C to one or more connection points 54 or to one or more of the cutting paths 56. The encoded location information, or other component 12 information, may be encoded explicitly in the markers 52A-C such that the information may be read directly without reference to another data source. Alternatively, the markers 52A-C may encode a pointer to information about the 3D printed component 12, such as relative location of the connection points 54 or cutting paths 56. For example, the marker 52A-C may encode a unique identifier or a URL that allows access to needed information which is stored in a database (e.g., website, web service, cloud). The database may also include other post-processing information, such as de-powdering, assembly, polishing, etc. It is also possible for the marker 52A-C (especially the marker 52A on the 3D printed component 12) to encode the identity of the 3D printed component 12 (e.g., a generic part number or a particular serial number). The marker 52A-C may also encode information for use in end-of-life treatment of the 3D printed component 12, such as disassembly, recycling or ownership instructions.

Where a marker 52A is placed on the 3D printed component 12 itself, it is preferable that the functionality of the 3D printed component 12 not be impacted by the marker 52A. In this case, the information encoded in the marker 52A may be used not only while manufacturing and assembly but also during disassembling and recycling at the end of life of the product. This may be useful in improving the efficiency of recycling. For example, recycling facilities may recycle in a more efficient manner if a component 12 or assembled product has direct information stored thereon about how to optimally disassemble, reuse and/or recycle components. If desired, it is also possible to encrypt information stored on a marker 52A-C when such information should be kept confidential.

An exemplary flow chart of a system and method as described herein is shown in FIG. 7. As shown, the 3D printer 14 may be used to 3D print the component 12, the support structures 18, 20 and one or more of the markers 52A-C at the same time (58). The markers 52A-C may then be sensed by the vision system 24 or other sensing system (60). Based on information derived from the makers 52A-C, one or more cutting paths 56 is then determined between the 3D printed component 12 and one or more support structures 18, 20 attached to the 3D printed component 12 (62). The cutting system 32 may then use the generated cutting path 56 to cut through the 3D printed component 12 or the support structure 18, 20 along the cutting path 56 to separate the 3D printed component 12 from the support structure 18, 20 (64). It is understood that the described system and methods may be implemented in the controller 30 in the form of a non-transitory computer readable medium including program code that controls the 3D printer 14, vision system 24 and/or cutting system 32 to autonomously perform the described methods.

It would also be useful to provide an autonomous manufacturing production cell arrangement to realize digital designs into functional products. The autonomous manufacturing cell arrangement may include two elements. On the one hand, a set of physical devices and equipment, such as, but not limited to, 3D printers, lasers, printers, robotic systems, vision and sensor systems, storage systems, quality inspection, conveyor belts, grippers, milling or CNC machines. The main purpose of these devices involves performing the required set of operations, such as printing, polishing, removal of material, inspection or assembling, to physically transform raw material and raw pieces into a functional product. On the other hand, a set of intelligent control systems determine and learn processing steps based on prior knowledge of the product (e.g., CAD for a component, assembly plan, etc.) and/or input data from the physical systems. The control systems transform the available data into useful information in order to execute a set of tasks that optimally create a functional product, based on user-defined performance indicators, such as cost, production time or number of steps.

A manufacturing production cell arrangement would also be advantageous which autonomously designs the production process and coordinates, executes, controls, monitors and improves the processing steps to obtain fully functional products. Such technology would enable flexible, reliable, and cost competitive production of customized parts at large volumes and short lead times. A production cell arrangement is described herein that autonomously designs, implements, controls, monitors, and improves the processing steps to obtain a fully functional component, part, piece or equipment, which needs to be manufactured and has specific features (such as material, mechanical and electrical properties, functional properties, quality specifications, attached components or surface finish). On the one hand, the manufacturing cell arrangement includes hardware, such as (but not limited to) production, assembly and processing machines and devices, as well as robotic systems, transportation, storage, and quality control systems. On the other hand, the devices and machines in the manufacturing cell arrangement need to collaborate and work together in an autonomous manner to fulfill an objective defined by the customer, such as minimum production time or minimum production cost. The available information for the system may include prior knowledge of the component, part, piece or equipment and its requirements (CAD models, assembly plan, etc.), input data from the physical systems in the manufacturing cell arrangement, and process data generated by the cell arrangement. Decision tasks include (but are not limited to): design of the production process, namely the processing steps required to obtain the product; assignment of production steps to the different hardware; production sequence; production activities within each hardware; coordination and control of the production activities; monitoring of the processing steps; learning strategy of the production steps; and learning of optimal process parameters maximizing, e.g., the end quality.

The autonomous manufacturing production cell arrangement relies on production hardware (i.e., post-processing tools) as referred to above, such as 3D printers, lasers, robotic systems, CNC machines, storage shelves and conveyor belts. The autonomous system considers a variety of available production information, including prior knowledge of the product (e.g., CAD of the parts, assembly plan, material properties) and the data generated by the manufacturing cell arrangement, in a set of intelligent learning control systems to optimally fulfill an objective defined by the customer. This provides manufacturing autonomy, which results from the intelligent control systems, to design and orchestrate manufacturing cell activities and improve the production process by learning. The result of these control systems is a set of processing steps and processing parameters to produce a fully functional product. The set of learning algorithms and methods, which are encoded in the control systems, are responsible for the following activities: enabling the coordination and communication among different machines and devices, designing and implementing the learning of the process steps and the most suitable process parameters for each processing step, reconciling data stemming from the machines and devices, integrating available information into a set of processing steps, and autonomous execution of the production process. The autonomous post-processing of 3D printed components described herein may also be extended to other manufacturing operations, such as the autonomous assembly of the 3D printed components and many others.

Figure 8:
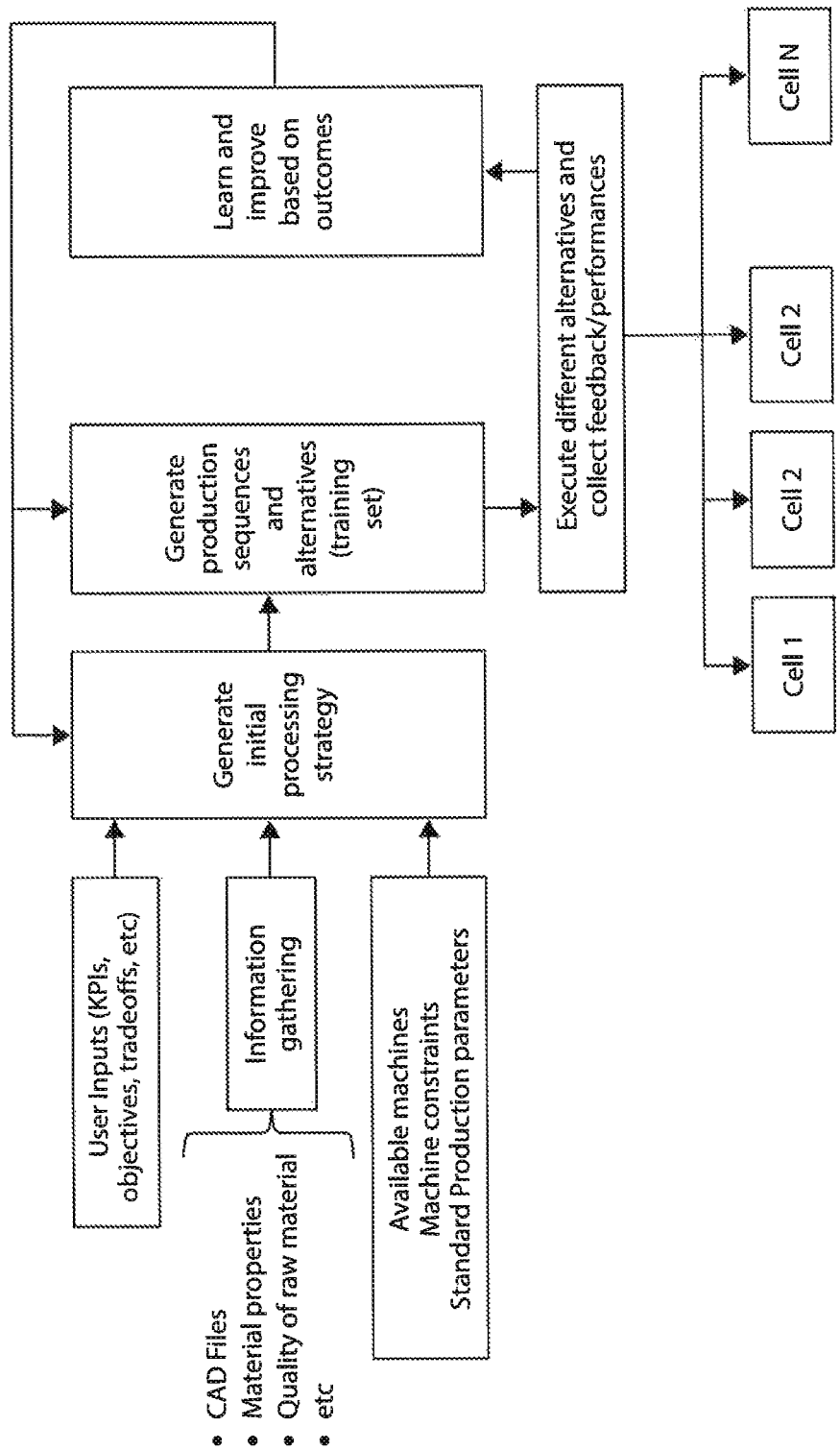
FIG. 8 is a schematic of an autonomous method of post-processing 3D printed components, showing information input and learning.

The intelligent control systems embedded in the autonomous manufacturing cell arrangement belong to either of two main software blocks: (i) the process design and optimization block, or (ii) the process execution and control. The former block (i) analyzes manufacturing cell components, performs calculations, and improves the steps and parameters to optimally produce a desired product based on selected performance indicators (KPI) using a learning strategy, which relies on a manufacturing cell description, including available machines and devices and their specifications, product information (such as a CAD design of the final product) and process measurements resulting from process execution. The second block (ii) controls the execution of the manufacturing steps and captures data from sensors and devices to create new information which is shared with the process design and optimization block. In order to create a feasible processing strategy and learn an optimal strategy, the following steps may be used. A list of available machines and devices in the manufacturing cell arrangement may be read. A performance indicator may also be selected. Product information (CAD files, pieces, materials, properties, quality requirements, etc.) may also be read. An initial processing strategy based on the available information may be obtained, which is satisfies cell boundaries and machine/device capabilities, including required processing steps, sequencing, and machine/device parameters. A learning algorithm may be called to set up the components to be improved and create a set of representative production sequences to be run in the manufacturing cell arrangement (training set). The processing steps may be executed multiple times based on the training set provided by the learning algorithm to collect process measurements from the manufacturing cell arrangement. Feedback may also be included from a continuous quality control system which monitors quality during the build process. Self-corrective actions may also be included during process execution through the control system to avoid incidents. The learning algorithm may be solved to obtain a generalization from the observed measurements about the optimal processing sequence and process parameters, considering the production boundaries of the manufacturing cells, the constraints of the CAD, product specifications and selected performance indicators (cost, energy, ageing, weight, etc.). The results may be refined by repeating the above steps using the learned parameters that are obtained during the respective call to the learning algorithm. In subsequent runs of the processing strategy, the learning algorithm may employ different processing tools in order to better satisfy the set performance indicator. The learning algorithm may also be called to understand variability caused by varying input parameters by (a) using solution information obtained from the last call to the execution, and (b) making multiple calls to the generalization strategies that use classification and regression techniques. An illustration showing the input information, learning, and execution and adaptation using feedback is shown in FIG. 8.

The task of the 3D printers in the described arrangement is to produce the majority (e.g., 90%) of individual components for the final product. As soon as a component is 3D printed, the information is sent to a production block which processes it and sends instructions to a robotic system on how to remove the base plates with 3D printed components thereon and then autonomously executes post-processing tasks on the component, e.g., removal of support structures, machining of surface edges, polishing, heat treatment and quality inspection.

The post-processing process may begin with a camera recording 3D printed components on a base plate. The images may be processed by a production block algorithm that differentiates support structures from the main 3D printed component. Based on this information the connection points between supports and 3D printed component may be generated and can represent a trajectory the robot will later follow while removing the support structures. To achieve this, the production block algorithm plans the removal and sends instructions to the robotic system about what tool to choose (e.g., laser cutting and/or milling tool depending on the material to be removed) and later the type of brush for fine surface polishing. At the beginning, the production block may have a pre-setting of the different options, and then with time it may self-learn what tool to choose based on support structure removal experience. During the process, the robotic system may use its vision and laser scanner capabilities to record the 3D printed component and compare the dimensions of the real 3D printed component with a CAD drawing to certify the quality of the printed components.

After post-processing, the same or another robotic system or a combination of the two may take the component over and start assembling different parts (e.g., made of different materials) into the final product. Here, the assembly block algorithm may be used to control and plan the assembly processes. The first input may be taken from the CAD design of the components and product. The assembly block algorithm may then calculate steps and identify the required tools for each step of the assembly. The robot may receive this information and starts the execution. In addition, the robotic system may use its vision capabilities to receive information about the product and its working environment in real time and send such information to the assembly block to update the assembly plan. The input may be provided by cameras and other sensors, such as acoustic measurements, laser measurements, X-ray, etc. The assembly block preferably decides autonomously which order to handle individual components to obtain the final product.

The complete production line may therefore include machines that are organized in a cell-architecture. A cell itself is equipped with a set of tools (robot, printer, or furnace plus machining tools, like a laser, mills, etc., or assembly tools, like fixtures and wrenches) and sensors. Such organization offers higher flexibility, priority-based production, scalability, and is robust against unplanned downtime of single cells.

Figure 9:
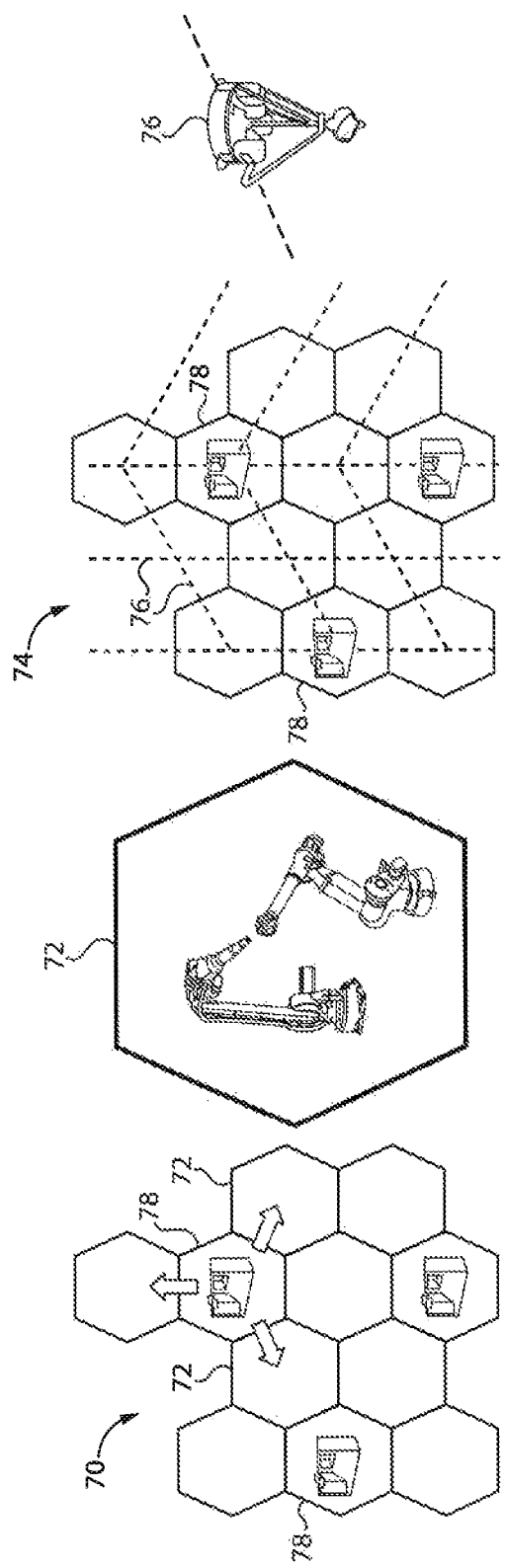
FIG. 9 is a schematic of cell arrangements for autonomously post-processing 3D printed components.

The cells may execute the tasks required to build a product in the following manner. Additive manufacturing cells may be used that handle different materials which may be used anywhere in the product. Conventional production equipment may be used that is enabled to use production tools which are created by tool printers as needed. Stock of commodity components (e.g., screws, etc.) may be used that are not product specific and are used in any of the components or assemblies. Storage systems may be used for produced intermediate components. A system may be used for transportation of parts (e.g., mobile robot, overhanging robot, drones, etc.). Robot cells may be used to assemble all of the components together into finished products. Quality inspection cells may be used that can perform various checks (e.g., surface checks, tomography, functional tests) on the individual components or the assembled product. An example of a cell arrangement is shown in FIG. 9. As shown in one cell arrangement 70, productions cells 78 which perform 3D printing, machining or assembly may have robotic cells 72 interspersed therebetween. The robotic cells 72 may perform assembly, machining, inspection of multiple 3D printed components or move components between different production cells 78. In another cell arrangement 74, a robotic conveyor 76 may also be used to move components between production cells 7 if desired.

Figure 10:
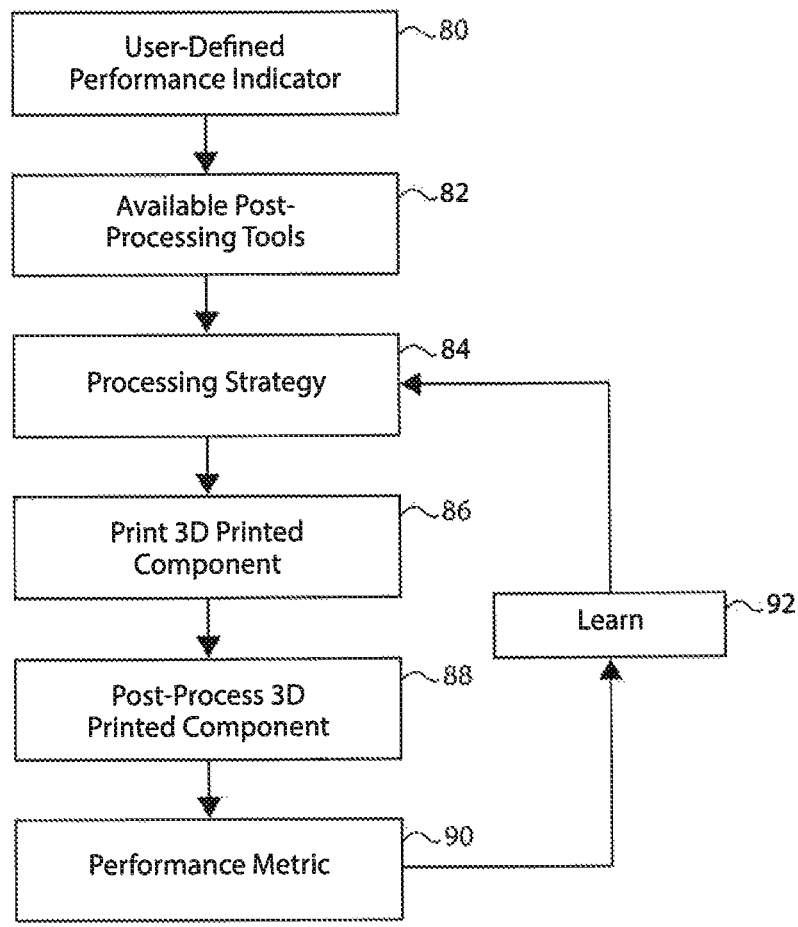
FIG. 10 is a flow chart of a method of post-processing 3D printed components.

An exemplary flow chart of a system and method as described herein is shown in FIG. 10. In the first two steps, a user-defined performance indicator (80) and a list of available post-processing tools (82) is read from one or more computer memories. The user-defined performance indicator may be a performance of post-processing the plurality of 3D printed components 12 into finished or partially finished components and may include cost, production time or number of steps. The available post-processing tools may have different processing capabilities and may include subtractive manufacturing methods, such as a laser or a mill, as well as a wrench or any of the tools, machines, etc. described above. The list of available post-processing tools may also include post-processing tools from different production cells 78. For example, the cell arrangement may have production cells 78 interspersed by robotic cells 72. The robotic cells 72 may perform post-processing steps, for example, assembling multiple 3D printed components 12 together, or may move 3D printed components between different production cells 78. Conveyors 76 may also move the 3D printed components 12 between the production cells 78. The production cells 78 may include one or more 3D printers 14 used for printing the 3D printed components 12, and may also include a CNC machine or other production equipment as described above. After reading the user-defined performance indicator and the list of available post-processing tools, a first post-processing strategy may be generated in one or more computer processors using the user-defined performance indicator and the list of available post-processing tools (84). The first post-processing strategy may include computer instructions for operating a first subset of the post-processing tools. A first 3D printed component 12 may then be printed with one or more 3D printers 14 (86). It is understood that the post-processing strategy could be generated after the 3D printed component 12 is printed if desired. The first 3D printed component 12 is then post-processed using the first post-processing strategy and the first subset of the post-processing tools (88). Post-processing may include removing a support structure 18, 20 which is printed with the 3D printed component 12 or any other post-processing process described above. For example, removing the support structure 18, 20 may include milling, laser cutting or sawing through the 3D printed component 12 or the support structure 18, 20. The support structure 18 may be attached to a base 10 upon which the 3D printed component 12 is formed. A first performance metric is then determined with one or more sensors corresponding to the user-defined performance indicator in response to the post-processing of the first 3D printed component 12 (90). The system may then learn from the difference between the user-defined performance indicator and the first performance metric to refine future post-processing strategies (92). For example, a second post-processing strategy may then be generated in the one or more computer processors using the user-defined performance indicator, the first performance metric and the list of available post-processing tools (92, 84). The second post-processing strategy may include computer instructions for operating the first or a second subset of the post-processing tools, and the second post-processing strategy may be different from the first post-processing strategy. The second post-processing strategy may include computer instructions for operating the second subset of the post-processing tools where the first and second subset of the post-processing tools include different post-processing tools. The first and second post-processing strategies may also include a quality inspection of the first and second 3D printed components 12. For example, the quality inspection may compare the 3D printed components 12 to a CAD drawing. A second 3D printed component 12 may then be printed with the one or more 3D printers 14 (86) and may be post-processed using the second post-processing strategy and the first or second subset of the post-processing tools (88). A second performance metric may then be determined with the one or more sensors corresponding to the user-defined performance indicator in response to the post-processing of the second 3D printed component 12 (90). The first performance metric and the second performance metric may then be compared in the one or more computer processors to determine a level of improvement between the first and second performance metrics with such learning and improvement occurring with each iteration if desired (92). Preferably, the entire method runs autonomously.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A method of post-processing a 3D printed component, comprising:
    storing a first image of a component in memory;
    determining a cutting path between the 3D printed component and a support structure attached to the 3D printed component based on the first image, in which the cutting path is visible or in which regions are generated to define the component and the support structure;
    capturing a second image of an actual 3D printed component, the actual 3D printed component corresponding to the component of the first image;
    in response to the second image differing from the first image beyond a threshold, updating the first image to adjust the first image and the cutting path, wherein the first image is updated based on differences between the first image and the second image; and
    outputting the adjusted cutting path to a post-processing system for further processing of the 3D printed component.

2. The method according to claim 1, wherein the post-processing system is a cutting system, and further comprising cutting through the 3D printed component or the support structure along the cutting path to separate the 3D printed component from the support structure.

3. The method according to claim 2, wherein the cutting comprises milling, laser cutting or sawing through the 3D printed component or the support structure.

4. The method according to claim 2, wherein a plurality of the first image are stored in the memory, at least some of the plurality of the first image includes the 3D printed component and the support structure attached thereto, and further including learning a location of a connection between the 3D printed component and the support structure from the plurality of the first image with machine learning or artificial intelligence.

5. The method according to claim 2, wherein a plurality of the second image are captured from different 3D printed components, each of the plurality of the second image includes the 3D printed component and the support structure attached thereto, and further including learning a location of a connection between the 3D printed component and the support structure from the plurality of the second image with machine learning or artificial intelligence.

6. The method according to claim 2, wherein the first image is a synthetic image and/or wherein the second image is an RGB image, depth image, cloud of points or line scan.

7. The method according to claim 1, wherein a plurality of the first image are stored in the memory, at least some of the plurality of the first image includes the 3D printed component and the support structure attached thereto, and further including learning a location of a connection between the 3D printed component and the support structure from the plurality of the first image with machine learning or artificial intelligence.

8. The method according to claim 1, wherein a plurality of the second image are captured from different 3D printed components, each of the plurality of the second image includes the 3D printed component and the support structure attached thereto, and further including learning a location of a connection between the 3D printed component and the support structure from the plurality of the second image with machine learning or artificial intelligence.

9. The method according to claim 1, wherein the first image is a synthetic image and/or wherein the second image is an RGB image, depth image, cloud of points or line scan.

10. The method according to claim 1, further comprising a database of a plurality of the first image and a plurality of the second image, wherein the cutting path is determined based on machine learning or artificial intelligence using the database.

11. The method according to claim 1, wherein the first image is generated from a CAD model of the component and/or wherein the first image is captured from another 3D printed component; and
wherein the first image is updated based on the differences between the first image and the second image.

12. The method according to claim 11, wherein two different second images of the 3D printed component are captured of two different regions of the 3D printed component, each second image being of a different region, and two different regions in the first image corresponding to the two different regions of the 3D printed component are updated based on the two different second images.

13. The method according to claim 1, wherein the cutting path is through the support structure and is spaced away from the 3D printed component.

14. The method according to claim 1, wherein the support structure is attached to a base upon which the 3D printed component is formed or wherein the support structure is attached at opposite sides to different portions of the 3D printed component.

15. The method according to claim 1, wherein the 3D printed component and the support structure are both metallic and/or
wherein the 3D printed component and the support structure are both the same material with the same curing.

16. The method according to claim 1, wherein the support structure comprises a plurality of support members spaced apart from each other and parallel to each other.

17. A method of removing a support structure from a 3D printed component, comprising the steps of:
storing a first image of a component in memory;
determining a cutting path between the 3D printed component and a support structure attached to the 3D printed component based on the first image, in which the cutting path is visible or in which regions are generated to define the component and the support structure;
capturing a second image of an actual 3D printed component, the actual 3D printed component corresponding to the component of the first image;
in response to the second image differing from the first image beyond a threshold, updating the first image to adjust the first image and the cutting path, wherein the first image is updated based on differences between the first image and the second image;
outputting the adjusted cutting path to a post-processing system for further processing of the 3D printed component; and
removing the support structure from the actual 3D printed component via the pot-processing system.

18. The method according to claim 17,
wherein the first image is updated periodically based on differences between the first image and the second image of the actual 3D printed component.

* * * * *